E. BYARS.
DRIVING GEAR FOR VEHICLES.
APPLICATION FILED DEC. 1, 1909.
968,447.
Patented Aug. 23, 1910.
3 SHEETS—SHEET 2.
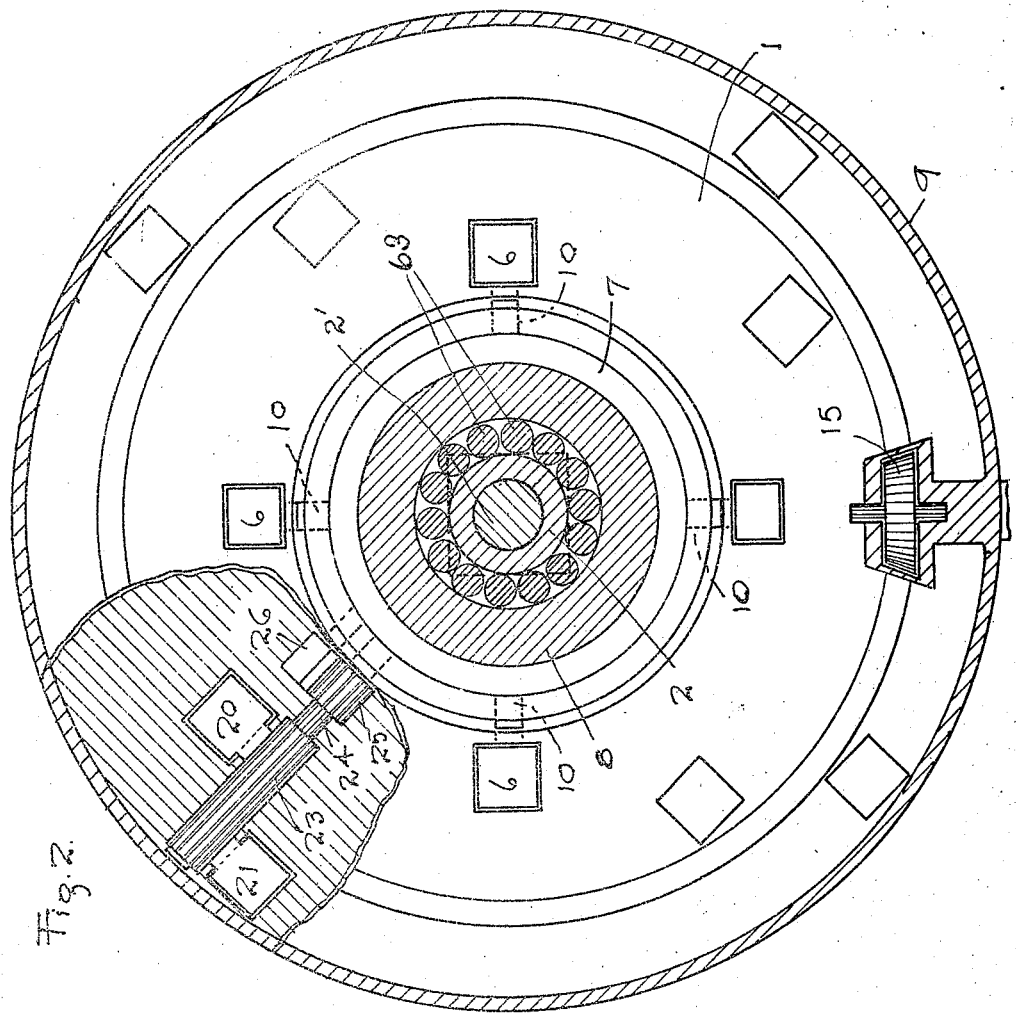
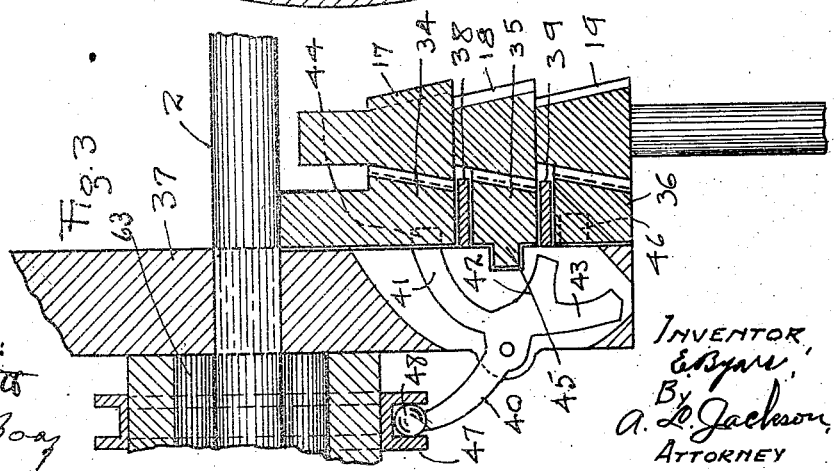
Witnesses:
Inventor,
E. Byars,
By A. L. Jackson,
Attorney

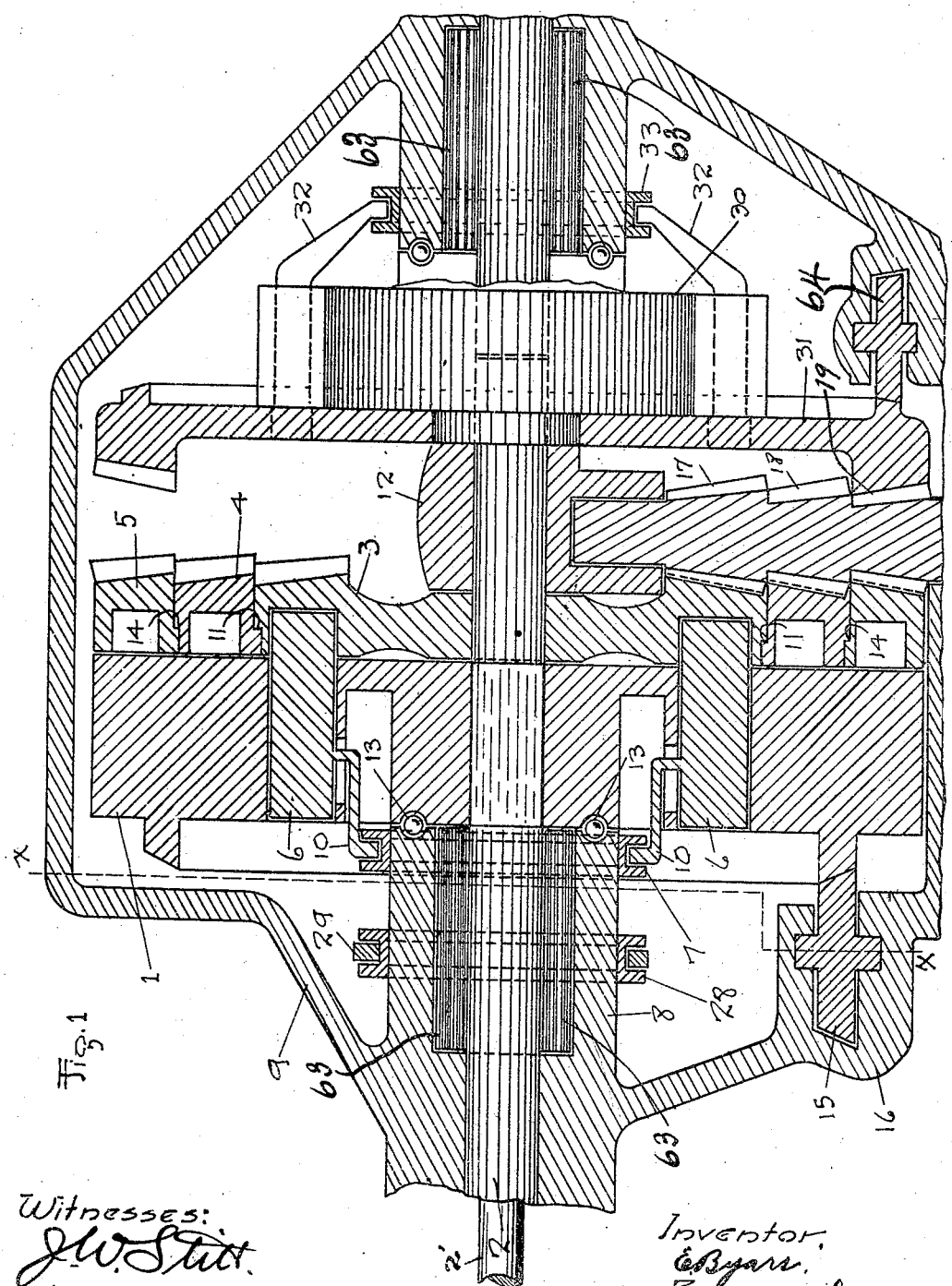

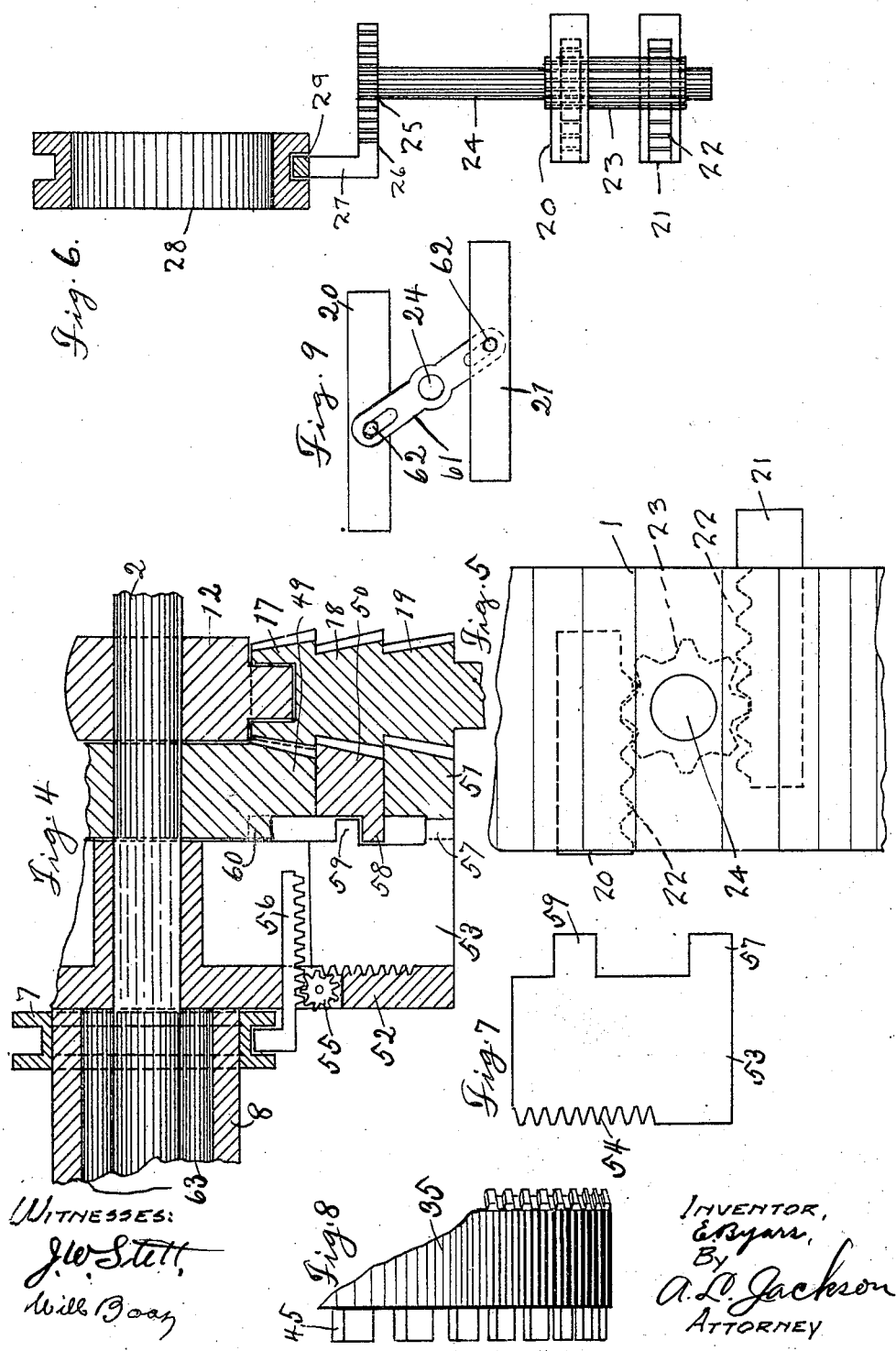

UNITED STATES PATENT OFFICE.

EDGAR BYARS, OF AMARILLO, TEXAS.

DRIVING-GEAR FOR VEHICLES.

968,447.

Specification of Letters Patent. Patented Aug. 23, 1910.

Application filed December 1, 1909. Serial No. 530,846.

*To all whom it may concern:*

Be it known that I, EDGAR BYARS, a citizen of the United States, residing at Amarillo, in the county of Potter and State of Texas, have invented certain new and useful Improvements in Driving-Gear for Vehicles, of which the following is a specification.

My invention relates to driving gear for vehicles and more particularly driving and transmission gear for motor vehicles, and the object is to provide gearing for increasing the speed of the vehicle without increasing the speed of the motor and also for decreasing the speed of the vehicle and gaining power by back and direct gearing. At times all the power of the motor is not needed. In such cases I have provided means for decreasing the speed of the motor and at the same time increasing the speed of the vehicle. This is accomplished by making the transmission of power direct,—transmitting through only one gear to obtain the various speeds. The speed is increased and yet the power is decreased and vice versa. A plurality of driving wheels are provided for the rear axle of vehicles which are provided with a shaft drive. In vehicles which are provided with a double chain drive, the improved gearing is applied to the jack or counter shaft. The advantage is that the wear on the motor is greatly decreased when making high speed. There will be less vibrations of the motor and less danger of breaking the motor or any other part of the vehicle and the vehicle will move more evenly or smoothly. A high speed may be obtained with the engine or motor shaft running about two and one-half times while the axle runs or turns once. Where greater power is needed, a gearing is used which will make about three and one-half turns while the axle turns once. In extreme cases, where greater power is required a gearing may be used with which the motor or engine shaft will turn about five times while the axle turns once. In vehicles which are provided with double chain drive the variation can be still greater because there is greater space for clearance.

The improved gearing may be used for driving either solid shafts or shafts provided with differential gearing, but the improved gearing is herein claimed for driving a shaft and not in combination with differential gearing.

Other objects and advantages will be fully explained in the following description and the invention will be more particularly pointed out in the claims.

Reference is had to the accompanying drawings which form a part of this application and specification.

Figure 1 is a broken sectional view of the housing and the gearing. Fig. 2 is a section, taken substantially on the line $x$—$x$ of Fig. 1. Fig. 3 is a sectional view, showing a variation from the mechanism shown in Figs. 1 and 2. Fig. 4 is a detail view of the gear-shifting mechanism, this being a variation from the mechanism shown in Figs. 1 and 2. Fig. 5 is a detail view of the mechanism shown in Figs. 1 and 2. Fig. 6 is a detail view of the gear shifting mechanism shown in Figs. 1 and 2. Fig. 7 is a detail view of the locking block shown in Fig. 4. Fig. 8 is a detail view of the cog wheel 35 shown in Fig. 3. Fig. 9 is a variation of the block shifting pinion 23, shown in Fig. 5.

Similar characters of reference are used to indicate the same parts throughout the several views.

The improved gearing is provided with a locking head 1 which is mounted on the rear axle in those vehicles which are provided with a shaft drive. This axle may comprise an inner shaft 2' terminating at the differential gear, and an outer hollow shaft or sleeve 2 to which is rigidly secured the differential housing 30, and the locking head 1. This head carries locking plungers for engaging gear wheels. In the drawings are shown a high speed cog wheel 3, a low speed cog wheel 5, and a cog wheel 4 for intermediate speed, each adapted to run independently of each other. Means are provided for locking any one of these wheels to the shaft 2. The head 1 is rigid with the shaft 2, that portion of the shaft on which the head is mounted being square in cross-section and the opening in the head being square in cross-section. Any one of the cog wheels 3, 4, or 5 may be locked to the head 1. This will make the cog-wheel rigid with the shaft 2. A series of locking plungers 6 are mounted in the head 1 for locking the wheel 3 in operative position. A grooved collar 7 is slidably mounted on the sleeve 8 of the housing 9. Each plunger 6 has an arm 10 which engages the groove in the collar 7. The gear wheel 4 is mounted concentrically with wheel 3 and is held in axial alinement by a shoulder 11. The wheel 3 is held in position by the head 1 and the bearing 12 which is held in place by the housing 9, being a part thereof. The head 1 is held in place by the sleeve 8, ball bearings 13 being interposed between the sleeve 8 and the head. The cog wheel 5 is mounted exteriorly and concentrically with the wheel 4 and is held in axial alinement therewith by an annular shoulder 14. A side-thrust bearing wheel 15 is mounted in the bearing 16 on the housing 9 to prevent side movement of the head 1. A series of pinions 17, 18, and 19 are provided for driving the cogs 3, 4, and 5. The pinions 17, 18, and 19 are rigid with the propeller or drive shaft (not shown). The wheel 3 is locked to the head 1 by an axial movement of the plungers 6 which may be effected by any suitable lever which engages the collar 7. When wheel 3 is locked to the head 1, the vehicle is driven by the pinion 17. The wheels 4 and 5 are locked to the head 1 by separate locking plungers 20 and 21 which are mounted in the head 1. These plungers 20 and 21 have integral racks 22 which are engaged by an elongated pinion 23 which is mounted on the shaft 24. Shaft 24 is driven by a second pinion 25. Pinion 25 is driven by a rack 26 which has arms 27 which engage the collar 28, being attached to the ring 29 which ring is moved whenever the collar 28 is shifted. The collar 28 is axially movable on the axle 2 and may be moved by any suitable lever. It is apparent that moving the collar 28 in one direction will drive one of the racks on plungers 20 and 21 in one direction and that moving the collar in the opposite direction will move the other rack. With the mechanism thus described either wheel 4 or 5 can be locked to the head 1. The drawings show the usual differential, the housing of which is indicated in the drawings by the numeral 30. A reversing gear wheel 31 is provided and this may be thrown in or out of gear by a collar 33 and arms 32 and the collar 33 may be moved by any suitable lever. The arms 32 lock the wheel 31 to the housing of the differential in the same manner that wheel 3 is locked to the head 1.

Fig. 3 shows a variation in the gearing and the shifting mechanism therefor. A head 37 similar to head 1 is used. A cog wheel 34 similar to high speed wheel 3 is driven by pinion 17. The intermediate wheel 35 is similar to wheel 4, but it is differently mounted. Wheel 35 is mounted concentrically relative to wheel 34 but is mounted on a bearing 38 which is integral with head 37. The wheel 36 is mounted concentrically relative to wheels 34 and 35 and on a bearing 39 which is integral with head 37. The means for locking the wheels 34, 35, and 36 to the head 37 consists in a lever 40 which is fulcrumed on the head 37 and which has a plurality of locking arms 41, 42, and 43. The wheel 34 has a series of recesses 44 therein and the arm 41 is adapted to enter any one of these recesses for the purpose of locking this wheel to the head 37. The wheel 35 has an annular flange 45 which has recesses to receive the arm 42 for the purpose of locking the wheel 35 to the head 37. The wheel 36 has recesses 46 therein adapted to receive the arm 43 for locking the wheel 36 to the head 37. The lever 40 is actuated by a collar 47 which is slidably mounted on the sleeve 8. Any movement of the collar 47 will affect the lever 40. The collar 47 has a deep groove therein and the lever has a bearing 48 which engages this groove. The collar can be moved to lock any one of the wheels 34, 35, or 36 to the head 37.

Another variation is shown in Fig. 4. Cog wheels 49, 50, and 51, similar to wheels 3, 4, and 5, are adapted to be driven by the pinions 17, 18, and 19. A different locking means is provided and mounted in a head 52 which is similar to head 1. The wheels 49, 50, and 51 are locked to the head 52 by a sliding block 53 which operates in a slot in the head 52. This block 53 has a rack 54 on one side and this rack is to be actuated by a pinion 55. This pinion is actuated by a rack 56 which has a lug to be engaged by the collar 7. The wheel 51 is locked to the head by a lug 57. The wheel 51 has a face rack similar to the rack 45 and the lug 57 is adapted to engage this rack at any point. The wheel 50 is locked to the head 52 by moving the block 53 until the lug 57 passes out of the rack on the wheel 51 and moves into a similar rack 58 on wheel 50. On a further movement inwardly the lug 59 on the block 53 will lock the wheel 49 to the head 52, by engaging a rack 60 which is similar to the rack 45. Any movement of the collar 7 will effect a movement of the block 53.

Instead of a rack and pinion for moving blocks 20 and 21, a double crank 61 may be mounted on shaft 24 and made to engage pins 62 which are inserted in the blocks 20 and 21, the crank 61 having elongated slots for the pins 62. See Fig. 9. Anti-friction roller bearings 63 are provided to prevent friction of the housing 9 on the shaft 2. A side thrust bearing wheel 64 is mounted in the housing 9 to hold the reverse gear wheel 31 in place.

Only three variable speed wheels are shown in the drawings. It is apparent that more wheels may be used without departing from my invention. The three cog wheels are driven by three pinions which are rigid with the driving shaft and the cog wheels are at all times concentric with each other and running whenever the pinions are running. The vehicle will be driven only when one of the cog wheels is locked to the locking head 1 which is rigid with the shaft 2, being mounted on a square portion of the shaft, the dotted outline of this square portion being indicated in Fig. 2.

Having fully described my invention what I claim is new and desire to secure by Letters Patent is:—

1. A driving gear for vehicles provided with a driving shaft and a driven shaft; a series of pinions rigid with said driving shaft, a locking head rigid with said driven shaft, a series of cog wheels loosely mounted on said driven shaft, a locking bolt for each cog wheel mounted in said locking head, and bolt throwing members constantly connected to said bolts for selectively reciprocating said locking bolts for locking any one of said gear wheels to said locking head.

2. A driving gear for vehicles provided with a driving shaft and a driven shaft; a series of pinions rigid with said driving shaft, a series of cog wheels concentric with each other and driven by said pinion, a locking head, a sliding bolt for each cog wheel mounted in said locking head, and bolt shifting members for such bolts constantly connected thereto for selectively reciprocating any one of said locking bolts to lock one of said cog wheels to said locking head.

3. A driving gear for vehicles provided with a driving shaft and a driven shaft; a housing, bearings in said housing for said shafts, a series of pinions rigid with said driving shaft, a series of cog wheels, each having a pair of recesses therein, a locking head rigid with said driven shaft, pairs of locking bolts mounted in said locking head and bolt throwing members constantly in engagement with said bolts for reciprocating one pair of said locking bolts at a time into the recesses of one of said cog wheels.

4. A driving gear for vehicles provided with a driving shaft and a driven shaft; a housing and bearings therein for said shafts, a series of pinions rigid with said driving shaft, a high speed cog wheel loosely mounted on said driven shaft and meshing with one of said pinions, an intermediate speed cog wheel mounted loosely on said high speed cog wheel and adapted to mesh with another one of said pinions, a low speed cog wheel mounted loosely on said intermediate speed cog wheel and adapted to mesh with one of said pinions, said cog wheels having means on their peripheries for holding the same concentric with each other, a locking head, sliding bolts carried thereby, and means for selectively shifting said sliding bolts for locking any one of said cog wheels to said locking head.

5. A driving gear for vehicles provided with a driving shaft and a driven shaft, said driven shaft having a square portion, a locking head rigid with said driven shaft and mounted on the square portion thereof, a series of pinions rigid with said driving shaft, a series of cog wheels mounted loosely about said driven shaft, the inner cog wheel being loosely mounted on said shaft and each outer cog wheel being mounted on the periphery of the adjacent inner cog wheel, and said cog wheels running wholly outside of said locking head and concentric with each other, pairs of sliding bolts mounted in said locking head, a housing inclosing portions of said shaft and inclosing said pinions and said cog wheels and said locking head and carrying bearings for said shaft, and means for shifting any one of the pairs of sliding bolts for locking any one of said cog wheels to said locking head.

6. A vehicle driving gear provided with a driving shaft and a driven shaft; a housing provided with bearings for said shafts, a series of pinions rigid with said driving shaft within said housing, a series of cog wheels mounted loosely within said housing concentric with each other and having recesses in the faces thereof, a locking head rigid with said driven shaft, pairs of sliding bolts corresponding to the recesses in said cog wheels mounted in said locking head, said housing having an interior sleeve abutting against said locking head, collars mounted on said sleeve and movable axially thereon and connections between said collars and said sliding bolts whereby any pair of said sliding bolts may be moved.

7. A vehicle gearing provided with a driving shaft and a driven shaft; a housing inclosing portions of said shafts and having interior projecting sleeves, roller bearings mounted within said sleeves about said driven shaft, a bearing for said driving shaft mounted on said driven shaft, a series of pinions rigid with said driving shaft, a disk-shaped locking head mounted on said driven shaft, a series of cog wheels adapted to mesh with said pinions mounted loosely on said driven shaft between said locking head and said driving shaft bearing, said cog wheels having their back faces running in a plane parallel to the adjacent face of said locking head, means for locking any one of said cog wheels to said locking head, a reverse gear loosely mounted on said driven shaft, and means for locking said reverse gear rigid with said driven shaft.

8. A vehicle driving gear provided with a driving shaft and a driven shaft; a disk-shaped locking head rigid with said driven shaft, a series of pinions rigid with said driving shaft, a series of cog wheels mounted loosely about said driven shaft wholly outside of said locking head and concentric with each other and having pairs of recesses therein, said cog wheels having means on their peripheries for holding the same concentric with each other, pairs of locking bolts mounted in said locking head, means for shifting any pair of said locking bolts into the recesses of any one of said cog wheels, and a side thrust bearing wheel to prevent displacement of said locking head.

In testimony whereof, I set my hand in the presence of two witnesses, this 24th day of November, 1909.

EDGAR BYARS.

Witnesses:
 J. W. STITT,
 A. L. JACKSON.